United States Patent [19]

Ayers

[11] Patent Number: 4,604,205
[45] Date of Patent: Aug. 5, 1986

[54] WATER REMOVING FILTER MEDIA

[75] Inventor: William R. Ayers, Bement, Ill.

[73] Assignee: Central Illinois Manufacturing Company, Bement, Ill.

[21] Appl. No.: 671,061

[22] Filed: Nov. 13, 1984

Related U.S. Application Data

[63] Continuation of Ser. No. 413,981, Sep. 2, 1982, abandoned.

[51] Int. Cl.⁴ ............................................. B01D 15/00
[52] U.S. Cl. ............................ 210/497.2; 210/502.1; 210/508; 210/DIG. 6; 55/524
[58] Field of Search ............... 210/689, 770, 437, 438, 210/448, 451, 452, 484, 493.1, 493.2, 493.4, 493.5, 496, 497.01, 497.1, 497.2, 502.1, 503, 504, 505, 508, 510.1, DIG. 5, DIG. 6; 524/734; 525/54.24, 54.31, 54.32; 55/524

[56] References Cited

U.S. PATENT DOCUMENTS

| | | | |
|---|---|---|---|
| 2,918,173 | 12/1959 | Daley et al. | 210/496 |
| 2,919,030 | 12/1959 | Grant et al. | 210/496 |
| 3,589,364 | 6/1968 | Dean et al. | 128/284 |
| 3,935,099 | 1/1976 | Weaver et al. | 210/702 |
| 3,981,100 | 9/1976 | Weaver et al. | 47/58 |
| 3,985,616 | 10/1976 | Weaver et al. | 195/63 |
| 3,997,484 | 12/1976 | Weaver et al. | 260/17.4 GC |
| 4,045,387 | 8/1977 | Fanta et al. | 260/17.4 GC |
| 4,134,863 | 1/1979 | Fanta et al. | 260/174.4 GC |
| 4,160,059 | 7/1979 | Samejima | 210/502.1 |
| 4,235,237 | 11/1980 | Mesek et al. | 128/284 |
| 4,242,206 | 12/1980 | Estabrooke | 210/489 |

Primary Examiner—Richard V. Fisher
Assistant Examiner—Wanda L. Millard
Attorney, Agent, or Firm—Wood, Dalton, Phillips Mason & Rowe

[57] ABSTRACT

A filter media for use in a filter employed to separate water and particulate material from a liquid to be purified, such as a hydrocarbon fuel. The filter media includes a porous material such as glass fiber having a density sufficient to provide the desired mechanical filtration and which carries a water insoluble, water-absorbing material as, for example, a starch-polyacrylonitrile graft copolymer. Also disclosed is a filter employing the media and a method of making the media.

1 Claim, 5 Drawing Figures

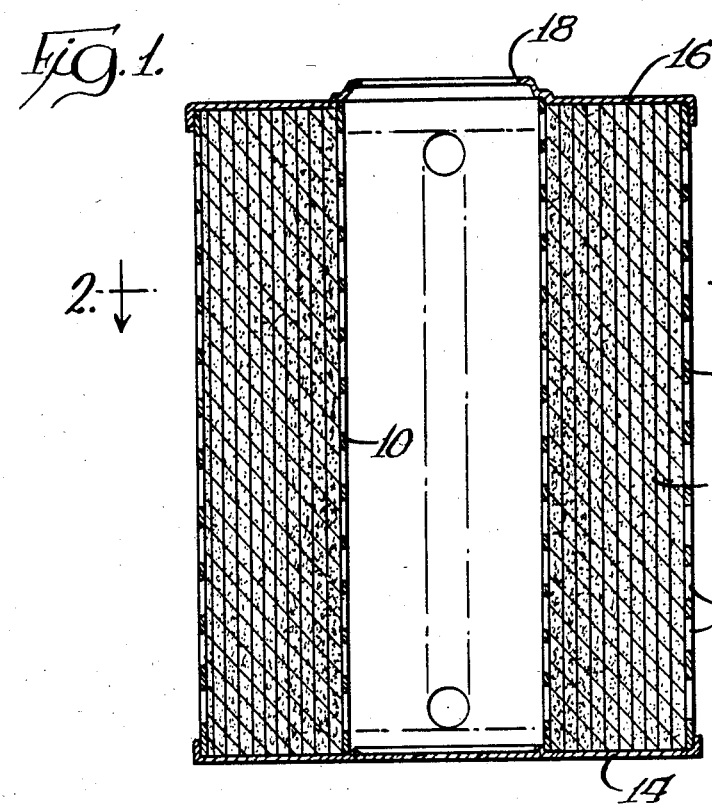
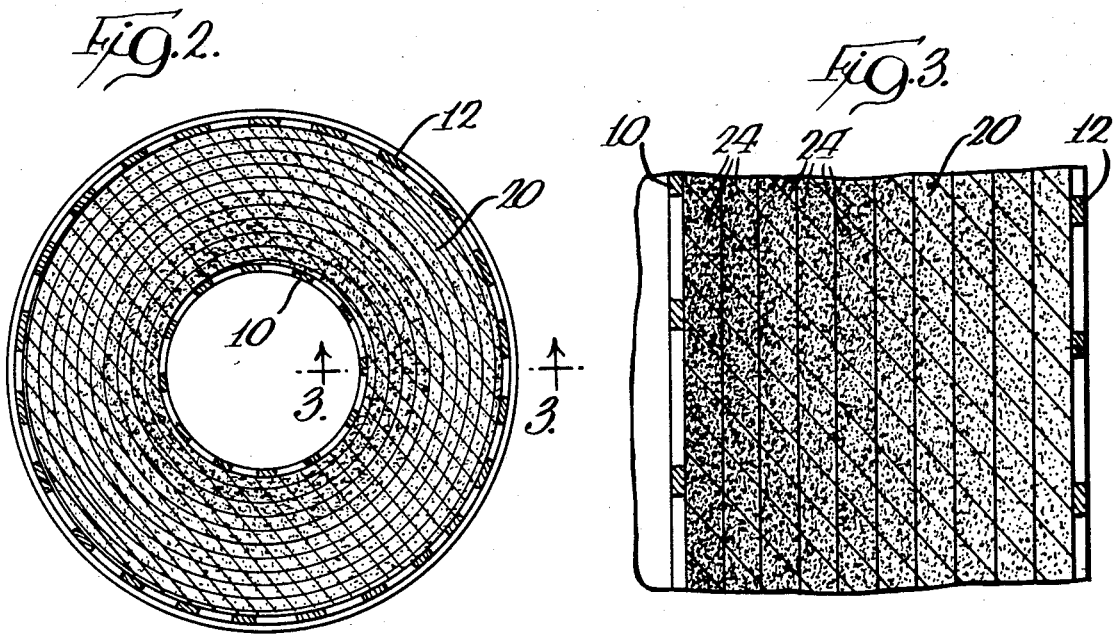

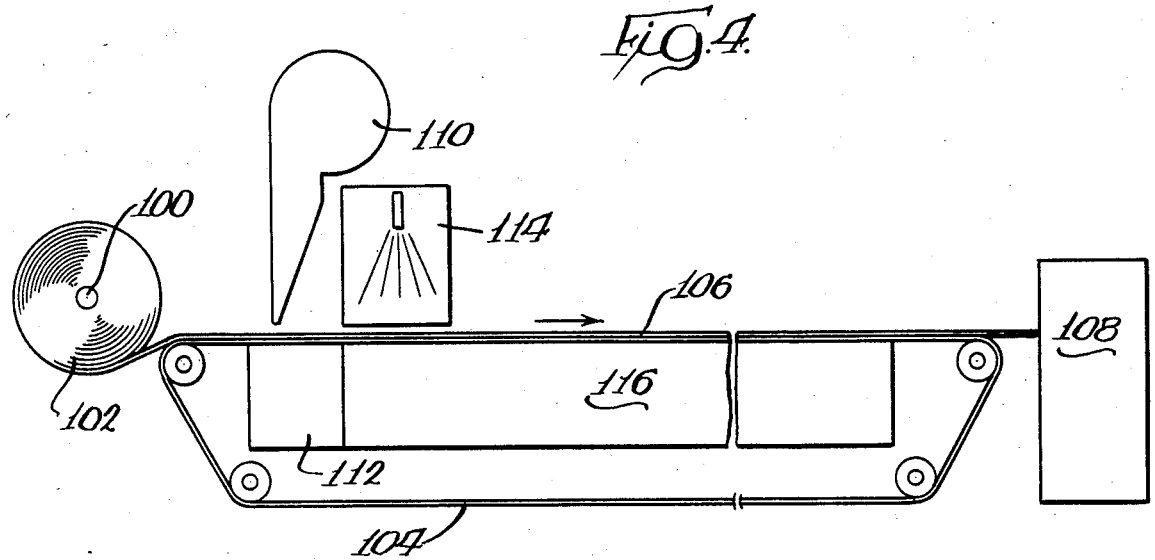
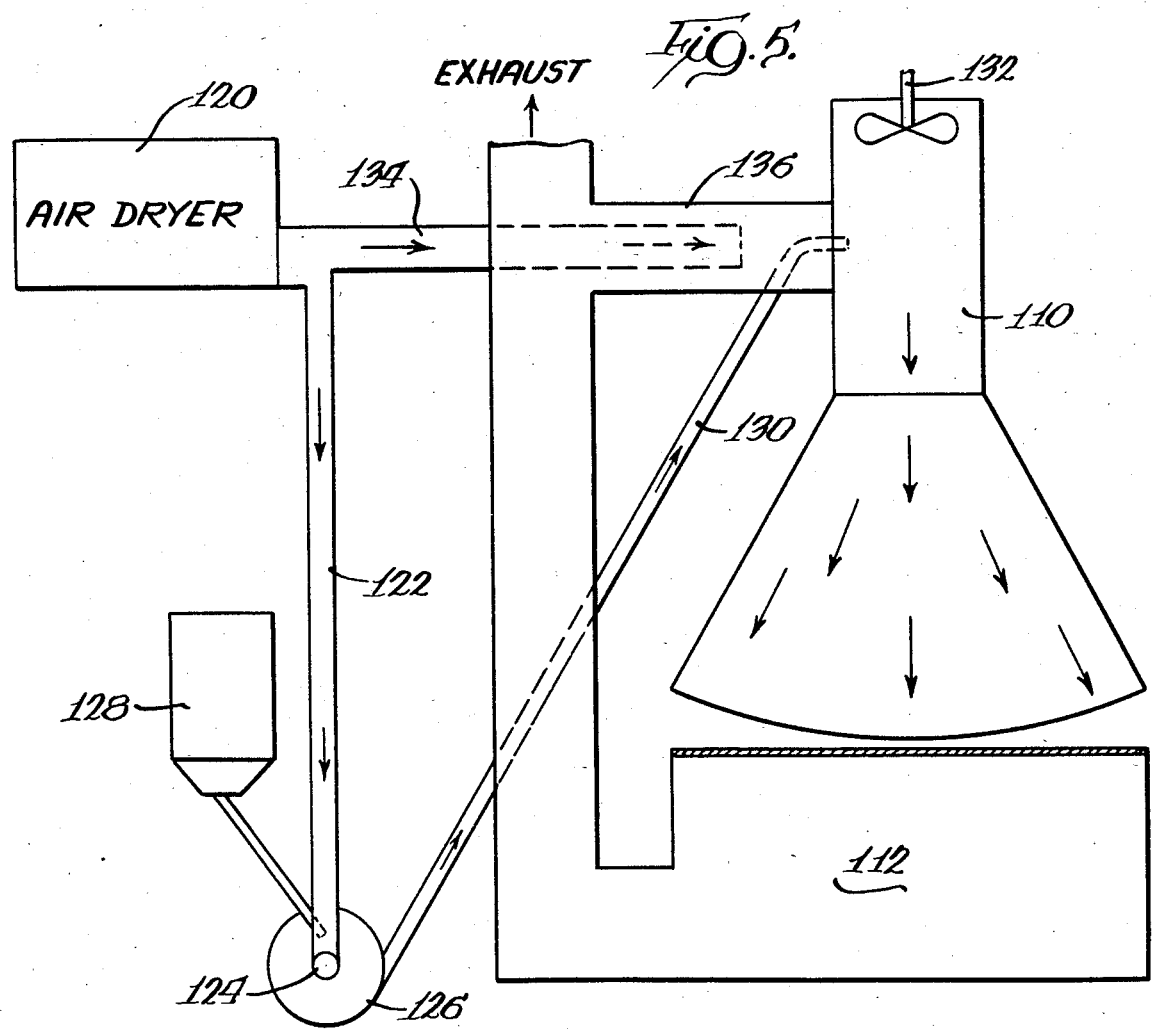

WATER REMOVING FILTER MEDIA

This application is a continuation of application Ser. No. 413,981, filed Sept. 2, 1982, now abandoned.

DESCRIPTION

1. Field of the Invention

This invention relates to a filter media that may be employed in filters utilized in removing water from another liquid to be purified while mechanically purifying the liquid by the removal of particulate material therein as, for example, water in fuel, and a method of making such filter media.

2. Background Art

Prior art of possible relevance includes the following U.S. Letters patents: U.S. Pat. Nos. 3,589,364 issued June 29, 1971 to Dean et al.; 3,935,099 issued Jan. 27, 1976 to Weaver et al.; 3,981,100 issued Sept. 21, 1976 to Weaver et al.; 3,985,616 issued Oct. 12, 1976 to Weaver et al.; 3,997,484 issued Dec. 14, 1976 to Weaver et al.; 4,045,385 issued Aug. 30, 1977 to Fanta et al.; and 4,134,863 issued Jan. 16, 1979 to Fanta et al.

As is well-known, many liquids are desirably filtered prior to their use to mechanically separate impurities, generally in the form of particulate material, from the liquid. For example, in the case of fuel, such material can plug carburetor jets or injection nozzles and otherwise interfere with the operation of an internal combustion engine for utilizing the fuel. Thus, fuel is typically filtered at the time it is dispensed as, for example, at a service station, and is filtered again just prior to its use by a fuel filter associated with an internal combustion engine.

While such filters adequately rid the fuel of particulate contaminants by mechanical filtering, many are such as to permit liquid contaminants to remain with the fuel. A particularly disturbing liquid contaminant often found in fuel is water. Water, being noncombustible, can cause severe malfunction of an internal combustion engine and may damage expensive engine components, particularly fuel injectors.

The hazards of water accumulation in fuel are perhaps best known to general aviation pilots who routinely, prior to initiating a flight, drain small amounts of fuel from low points in each fuel tank to inspect the same for the presence of water which could cause the aircraft engine to fail to develop full power or quit entirely at a critical moment in flight. The economical hazards of water in fuel are perhaps best known to owners or operators of diesel engines who have had fuel injection system components, which are quite expensive, damaged by the presence of water in the fuel. Many motorists have likewise been inconvenienced, particularly during the winter, by an automobile engine that refuses to start and/or run properly due to water in the fuel.

While water has been successfully removed from fuel prior to the present invention, the various means for accomplishing that result are frequently expensive, complex and/or inconvenient to use and/or replace.

The present invention is directed to overcoming one or more of the above problems.

SUMMARY OF THE INVENTION

It is a principal object of the invention to provide a new and improved filter media which may be advantageously employed in the mechanical filtering of a liquid and at the same time, absorb water contaminating such liquid; and to provide a method of making such a filter media.

According to one aspect of the invention, there is provided a filter media for use in filters employed to separate water and particulate material from a liquid to be purified. The filter media includes a porous filter material having a density sufficient to allow the liquid to be purified to flow therethrough and yet preclude the passage of particulate material. A water insoluble, water absorbing material is dispersed within and carried by the filter material.

In a highly preferred embodiment, the filter material is glass fiber to serve to coalesce water contained within the liquid to be purified.

A highly preferred embodiment contemplates that the water absorbing material be a starch-polyacrylonitrile graft copolymer.

A preferred method of making the filter media includes the steps of providing a fibrous mat of material adapted to mechanically separate particulate material from the liquid to be purified and thereafter applying starch-polyacrylonitrile graft copolymer to the mat. The method is concluded by the step of fixing the copolymer to the mat.

In the preferred embodiment of the method, the step of fixing is performed by spraying the mat with a volatile solvent containing a small percentage of water. High proof alcohol is suitable for the purpose.

The inventive method also contemplates that the amount of copolymer applied to particular portions of the mat be varied in a predetermined fashion.

The step of applying may be performed by directing granular copolymer at one side of the mat while applying a partial vacuum to the opposite side of the mat. The method may be performed while continuously advancing the mat from an applying station to a fixing station.

The invention also contemplates a water absorbing mechanical filter including a filter housing with an inlet port and an outlet port. The housing further includes a means defining a liquid flow path from the inlet port to the outlet port. A body of fibrous material is disposed within the housing and extends across the flow path. A quantity of starch-polyacrylonitrile graft copolymer is disposed within the body of fibrous material.

Preferably, the copolymer is dispersed throughout the body and the distribution is such that there is more graft coplymer nearer the outlet port than nearer the inlet port.

Other objects and advantages of the invention will become apparent from the following specification taken in connection with the accompanying drawings.

DESCRIPTION OF THE DRAWINGS

FIG. 1 is a sectional view of a filter made according to the invention and employing a filter media made according to the invention;

FIG. 2 is a sectional view of the filter taken approximately along the line 2—2 in FIG. 1;

FIG. 3 is an enlarged fragmentary sectional view taken approximately along the line 3—3 in FIG. 2;

FIG. 4 is a view of an apparatus that may be utilized in performing the method of making the filter medias; and FIG. 5 is another view of the apparatus showing additional components thereof.

BEST MODE OF THE INVENTION

An exemplary embodiment of a filter made according to the invention utilizing a filter medium made according to the invention is illustrated in FIGS. 1-3 inclusive and is seen to be comprised of a housing including inner and outer perforated metal cylinders, 10 and 12 respectively, which are concentric with each other. As seen in FIG. 1, the cylinders 10 and 12 are of equal length and are maintained in concentric relation as by glueing to an imperforate, bottom disc 14 and a top disc 16 having a central opening 18 in fluid communication with the interior of the cylinder 10.

In the space between the cylinders 10 and 12, the filter media 20 is disposed. As illustrated, the filter media 20 is formed as a spirally wrapped mat or batt. However, it is to be understood that other configurations as, for example, a pleated configuration, could be employed.

The discs 14 and 16 together with the cylinders 10 and 12 define a flow path for a liquid to be purified from an inlet defined by the opening 18 in the disc 16 to an outlet defined by the perforations 22 in the cylinder 12. Of course, if desired, the flow direction could be reversed.

According to the invention, the filter media 20 is formed of a porous material having a density sufficient to preclude the passage of particulate material in the fluid to be purified of a size greater than some predetermined minimum from passing from the inlet 10 to the outlet 22. Preferably, the filter media 20 is fibrous in nature and formed of a material having surface properties such that extremely small droplets of water contained within the liquid to be purified will coalesce to form larger droplets. Glass fiber is preferred because of its ability to provide such coalescing action and because of its low cost.

The porous material, of course, provides mechanical filtering action as alluded to previously and also carries a water-insoluble, water-absorbing material which is operative to absorb water droplets coalesced by the porous material. Such water-insoluble, water-absorbing material is shown in the form of granules 24 dispersed throughout a glass fiber mat.

A highly preferred water-insoluble, water-absorbing material is a starchlike composition, preferably, a starch-polyacrylonitrile graft copolymer such as disclosed in the previously-identified Weaver et al. and Fanta et al. U.S. Letters patents. In a highly preferred embodiment, the density of the granules 24 is greater near the outlet than near the inlet as shown in FIG. 3. Because the granules 24 will swell appreciably as they absorb water, it is desirable that their density be reduced near the outlet so as not to cause premature clogging of the filter due to the swelling of the granules.

The actual density of the granules 24 to a given quantity of glass fiber may vary dependent upon the ultimate use to which the filter media is put and the intended life expectancy. However, in general, it is preferred that the granules 24 be present in sufficient amount so that, as their absorptive capacity is approached, they will have swollen sufficiently so as to preclude all flow through the filter. The lack of such flow may then be taken by the user of the filter as an indication that the filter ought be changed.

Specific densities that have proved to be satisfactory when utilized on fiberglass batting available from John Manville TYPE AF-11-¼" with a starch copolymer known as WATER-LOCK A-100 available from Grain Processing Corp. range from 95 grams per square meter to 225 grams per square meter measured at 60% relative humidity and 70° F. Success has also been achieved using densities ranging from 90 grams per square meter to 220 grams per square meter on John Mansville fiberglass TYPE AF-4-¼" employing a starch copolymer known as WATER-LOCK A-120, also available from Grain Processing Corp.

Referring now to FIGS. 4 and 5, method and apparatus for making the filter media are illustrated. With reference to FIG. 4, there is shown a rotatable spindle 100 on which is received a roll 102 of the porous mechanical filtering material in batt form. A perforate belt conveyor 104 has an upper run 106 moving from left to right as viewed in FIG. 4 which carries the batt being taken off the roll 102 to a collection station 108 which may be of any desired type.

Near the left-hand end of the upper run 106 there is a granule applicator 110 which, as will be seen, is operative to direct the granules 24 (FIG. 3) downwardly toward the batt of porous filter material. Just below the upper run 106 of the belt and below the applicator 110 is a collection manifold 112 for collecting any of the granular material that passes through both the batt and the upper run 106 of the conveyor 104.

Immediately following the applicator 110 is a spray chamber 114 located above the upper run 106 of the belt. An elongated exhaust manifold 116 is disposed below the belt from the point of the spray chamber 114 to the end of the upper run 106 and may be exhausted in any suitable fashion.

The spray chamber 114 directs a highly volatile solvent containing a small amount of water at the batt containing the granules after application of the same by the applicator 110. A preferred volatile solvent having the above characteristics is 190 proof methanol. The methanol, upon contacting the batt, causes the granules 24 to be fixed to the fibers thereof and then is immediately flashed off due to its high volatility and collected by the exhaust manifold 116.

While the precise limits of water content in the volatile solvent have not been ascertained, it has been found that there will be no fixation of the granules if 200 proof, or pure solvent, is used. Similarly, at proofs of approximately 150 or less, it has been found that granules on the surface of the batt will collect so much water from the solvent as to form a virtually impenetrable layer which precludes the solvent from entering the interstices of the batt to set granules on the interior of the batt to adjacent fibers.

FIG. 5 illustrates in greater detail, the nature of the applicator 110. The system includes an air dryer or dehumidifier 120 as air is employed to propel the granules toward the batting. If ambient air conditions are such that relative humidity is rather high, difficulty may be encountered in the granules sticking together or agglomerating on a surface of the batt rather than penetrating the same. Thus, the use of the air dryer 120 allows application independently of ambient air conditions.

The dried air output is split into two fractions with one being directed by a conduit 122 to the inlet 124 of a high pressure radial blade blower 126. A conventional gear type powder dispenser 128 provides, at a predetermined rate, the granules 24 to the inlet 124 of the blower 126 and the resulting stream of granules and dried air is propelled through a conduit 130 to the upper end of the applicator 110. The applicator 110 includes a blower 132 which receives dried air from the air dryer 120 and which is operative to direct the granules downwardly such that they penetrate the fiber batt.

It will be observed that the stream of dried air from the air dryer 120 directed to the applicator 110 is via a conduit 134 which is fitting within a conduit 136. The conduit 136 is connected to the collection manifold 112 and may be connected to a suitable exhaust system as desired. In any event, an ejection system is formed such that a vacuum will exist below the upper run 106 of the belt in the vicinity of the applicator 110 to assist in drawing the granules fully into the fiberglass matting.

Variations in the density of application of granules to the porous filter material can be achieved by varying the rate of operation of the dispenser 128 and/or the lineal rate of travel of the conveyor belt 104.

INDUSTRIAL APPLICABILITY

From the foregoing, it will be appreciated that a filter media made according to the invention provides for both mechanical filtering and water absorption in an inexpensive and economical fashion. The filter employing the media can be constructed and arranged to provide an automatic indication that its useful life has been completed in terms of the ability of the filter media to swell and halt fluid flow therethrough. The method of making the filter media employs relative inexpensive machinery and relatively available and inexpensive materials such as methanol.

I claim:
1. A water absorbing, mechanical filter comprising:
a filter housing;
an inlet port in said housing;
an outlet port in said housing;
said housing further including means defining a liquid flowpath from said inlet port to said outlet port;
a body of fibrous material within said housing and extending across said flowpath; and
a quantity of starch-polyacrylonitrile graft copolymer dispersed throughout and fixed to said body, the distribution of the graft copolymer within said body being greater nearer said outlet port than said inlet port.

* * * * *